U S 0 0 6 0 5 4 9 4 1 A

United States Patent [19]
Chen

[11] Patent Number: 6,054,941
[45] Date of Patent: Apr. 25, 2000

[54] APPARATUS AND METHOD FOR INPUTTING IDEOGRAPHIC CHARACTERS

[75] Inventor: Xixian Chen, Palo Alto, Calif.

[73] Assignee: Motorola, Inc., Schaumburg, Ill.

[21] Appl. No.: 08/863,847

[22] Filed: May 27, 1997

[51] Int. Cl.[7] .................................................. H03K 17/94
[52] U.S. Cl. ............................ 341/28; 341/22; 345/171; 400/110; 379/353
[58] Field of Search ..................................... 379/353, 354, 379/93.18, 93.23, 93.27; 341/22, 28, 20; 345/168, 171; 400/110

[56] References Cited

U.S. PATENT DOCUMENTS

| | | |
|---|---|---|
| 4,375,922 | 3/1983 | Maegawa et al. . |
| 4,689,743 | 8/1987 | Chiu .......................................... 341/20 |
| 4,868,779 | 9/1989 | Seto . |
| 4,872,196 | 10/1989 | Royer et al. ............................... 341/28 |
| 4,954,955 | 9/1990 | Chiu .......................................... 341/22 |
| 5,031,206 | 7/1991 | Riskin . |
| 5,047,932 | 9/1991 | Hsieh . |
| 5,063,376 | 11/1991 | Chang . |
| 5,109,352 | 4/1992 | O'Dell . |
| 5,319,552 | 6/1994 | Zhong . |
| 5,378,068 | 1/1995 | Hua ........................................ 400/110 |
| 5,475,767 | 12/1995 | Du ........................................... 400/110 |
| 5,617,314 | 4/1997 | Zhong . |
| 5,619,563 | 4/1997 | Hsiao ....................................... 379/354 |
| 5,623,682 | 4/1997 | Fukunaga . |
| 5,634,134 | 5/1997 | Kumai et al. . |
| 5,713,033 | 1/1998 | Sado . |
| 5,818,437 | 10/1998 | Grover et al. ........................... 345/326 |

FOREIGN PATENT DOCUMENTS

| | | |
|---|---|---|
| 0319193A2 | 11/1988 | European Pat. Off. . |
| 0464726A2 | 6/1991 | European Pat. Off. . |
| 0689122A1 | 1/1995 | European Pat. Off. . |

*Primary Examiner*—Michael Horabik
*Assistant Examiner*—Timothy Edwards, Jr.
*Attorney, Agent, or Firm*—Romi N. Rose

[57] ABSTRACT

An apparatus (100) and method for inputting ideographic characters. The apparatus (100) has an input pad with a predetermined number of input keys (102, . . . 111). Theoretically, at least a stroke and a radical are mapped to each input key (102, . . . 111). After the apparatus (100) receives at least a first and a second input key entry, based on a number of input key entries received, the apparatus (100) determines whether the first input key entry is one of the following: a stroke and a radical. Thus, the method solves the ambiguity problems caused by such a mapping of the apparatus.

4 Claims, 4 Drawing Sheets

| TABLE 1 | | |
|---|---|---|
| DIGIT STREAM | START ADDRESS | NO. OF CHARACTERS |
| 0 | 1 | 1 |
| 2 | 2 | 2 |
| 5 | 4 | 1 |
| 6 | 5 | 1 |
| 7 | 6 | 1 |
| 22 | 7 | 1 |
| 23 | 8 | 2 |
| 24 | 10 | 1 |
| 29 | 11 | 1 |
| 31 | 12 | 1 |
| 35 | 13 | 1 |
| 39 | 14 | 1 |
| 40 | 15 | 2 |
| 45 | 17 | 3 |

| TABLE 2 | | |
|---|---|---|
| ADDRESS | CHARACTER | RANK ORDER |
| 1 | 乙 | 1 |
| 2 | 二 | 1 |
| 3 | 土 | 2 |
| 4 | 木 | 1 |
| 5 | 虫 | 1 |
| 6 | 口 | 1 |
| 7 | 三 | 1 |
| 8 | 十 | 1 |
| 9 | 丁 | 2 |
| 10 | 厂 | 1 |
| 11 | 七 | 1 |
| 12 | ト | 1 |
| 13 | ト | 1 |
| 14 | 扎 | 1 |
| 15 | 几 | 1 |
| 16 | 九 | 2 |
| 17 | 人 | 1 |
| 18 | 入 | 2 |
| 19 | 八 | 3 |
| 20 | 儿 | 1 |

*FIG.5*

APPARATUS AND METHOD FOR INPUTTING IDEOGRAPHIC CHARACTERS

FIELD OF THE INVENTION

This invention relates generally to inputting ideographic characters by using an input pad with a predetermined number of input keys, for example, a telephone input pad having ten input keys.

BACKGROUND OF THE INVENTION

A five stroke method of ideographic character data entry exists and is widely used in China and other parts of the world. In this method, five basic strokes are mapped to five computer digit keys located on the right side of the keyboard. The method is cumbersome and slow to use as it requires a large number of strokes to be entered on average to define a Chinese character.

In a known keyboard method, ten basic Chinese character strokes are mapped to ten keys of a computer keyboard: W, E, R, U, I, O, D, F, J and K. Twelve frequently used Chinese character radicals are mapped to another twelve keys: Q, A, S, L, Z, X, C, V, B, N, M and P. This method also uses ten digit keys plus the "-" key to select the candidates.

In the latter method, when a user enters the first stroke of a Chinese character, the most possible eleven candidate Chinese characters with the same first stroke are displayed. If the user cannot find the Chinese character he wants to input, the user enters its second stroke. As a result of entering the second stroke, the most possible eleven candidate Chinese characters with the same first two strokes are displayed. This process continues until the user finds the Chinese character he wants to input. When the user finds the Chinese character that he wants to input, the user can select the Chinese character from a candidate list by using the ten digit keys plus the "-" key on the computer keyboard.

The above process is also applicable when the user wants to input a Chinese character by first entering its radical followed by subsequent strokes. This method has the drawback of requiring at least 33 keys for data entry, which is acceptable for a full size computer keyboard, but is too many keys for a compact data entry device such as a wired telephone, wireless telephone, pager, keypad or the like.

There exists a need for an apparatus that maps the thirty Chinese basic strokes and the ten frequently used radicals to an input pad with a smaller number of keys, and a method that solves the ambiguity problem caused by such a mapping. There also exists a need to alleviate a problem of requiring the user to entering many strokes of a desired character.

BRIEF DESCRIPTION OF THE DRAWINGS

The features of the present invention are set forth with particularity in the appended claims. The invention itself, together with further features and attendant advantages, will become apparent from consideration of the following detailed description, taken in conjunction with the accompanying drawings. A preferred embodiment of the invention is now described, by way of example only, with reference to the accompanying drawings in which:

FIG. 5 is a data structure diagram showing two tables stored in a flash memory according to the alternative embodiment of the invention.

It will be appreciated that for simplicity and clarity of illustration, elements shown in the figures have not necessarily been drawn to scale. Where considered appropriate, reference numerals have been repeated among the figures to indicate corresponding elements.

DETAILED DESCRIPTION OF THE PREFERRED EMBODIMENTS

Figure 1:
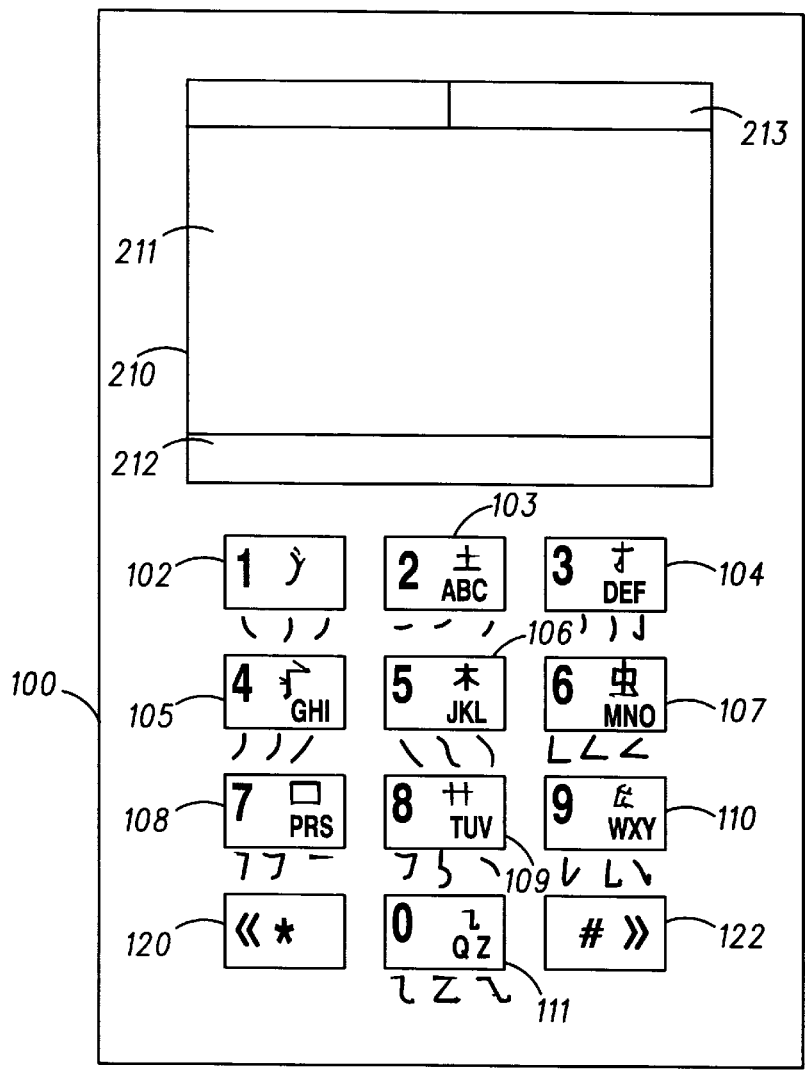
FIG. 1 is a front view of an illustrative ideographic character apparatus suitable to receive an input and to provide an output in accordance with a preferred embodiment of the present invention.

For the purposes of promoting an understanding of the principles in accordance with the invention, reference will now be made to the embodiments illustrated in the drawings and specific language will be used to describe the same. It will nevertheless be understood that no limitation of the scope of the invention is thereby intended. Any alterations and further modifications of the illustrated embodiments, and any additional applications of the principles of the invention as illustrated herein, which are equivalent or would normally occur to one skilled in the relevant art, are to be considered within the scope of the invention claimed.

With the application of the prior art keyboard method, a user may have trouble entering less frequently used Chinese characters because he may forget or not know multiple strokes of that character. Moreover, if the user is required to enter a lot of strokes before he can find the Chinese character that he wants to input, the user may forget what he has already entered because he is frequently switched between two modes: looking at the candidate list in search of the Chinese character that he wants to input and figuring out the next stroke that needs to be entered for the Chinese character that he wants to input.

In this document, an apparatus is addressed which maps at least ideographic (e.g., Chinese) basic strokes and radicals to common input keys of an input pad. A method is also addressed which solves ambiguity problems caused by such a mapping and which alleviates the problem of requiring the user to enter many strokes to find a desired character.

Referring to the drawings, FIG. 1 is a front view of an illustrative ideographic character apparatus (e.g., cellular telephone) 100 suitable to receive an input and to provide an output in accordance with a preferred embodiment of the present invention. As depicted in FIG. 1, the present invention configures thirty ideographic basic strokes, ten frequently used radicals and ten digits (optional) in such a way that they are mapped to a common input pad having a predetermined number of input keys 102, . . . , 111. Each input key represents at least a stroke and a radical on the input pad. Such an input pad can either be, but not limited to, a telephone pad, a pager, a personal digital assistant, an answering machine and a facsimile machine. Thus, the predetermined number of input keys can either be between a range of one and twelve; no more than ten; or at least ten but no more than twenty.

The apparatus 100 has a display (output) 210. The display 210 has a main display area 211, a character display area 212 and a digit display area 213.

Figure 2:
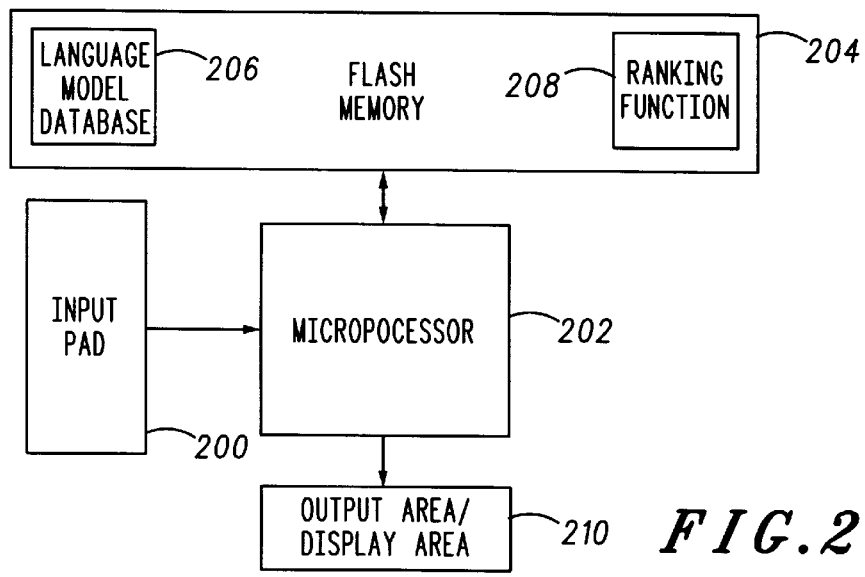
FIG. 2 is a block diagram detailing internal circuitry of the apparatus of FIG. 1 in accordance with the preferred embodiment of the present invention.

FIG. 2 is a block diagram detailing internal circuitry of the apparatus of FIG. 1 in accordance with the preferred embodiment of the present invention. As shown in FIG. 2, the cellular telephone is illustrated as having an input pad, a microprocessor 202, a flash memory 204, a language model database 206 and a ranking function 208.

The microprocessor 202 is coupled to the input pad 200. The flash memory 204 is coupled to the microprocessor 202. The language model database 206 and the ranking function 208 are stored in the flash memory 204. The language model database 206 theoretically sorts ideographic characters into a plurality of groups. Each group is represented by a common sequence of input keys. The ranking order function 208 ranks the ideographic characters, preferably in descending order based on a highest probability of being a desired character. Further details of the mapping in the flash memory 204 is discussed below with reference to FIG. 5.

The apparatus may also comprise a display area 210. Such a display area 210 can either be coupled to or couplable to the microprocessor 202. The display area 210 is, but not limited to, one of the following: a liquid crystal display, a monitor, a printer and a holographic screen.

For purposes of illustration and clarification of the present invention, upcoming examples and accompanying drawings will assume that the input pad is a telephone pad with no more than ten input keys 102, . . . 111 and two function keys 120 and 122 (e.g., the asterisk key (*) and the pound key (#), respectively). However, the present invention is neither dependent on any particular type of input pad nor dependent on any particular number of input and function keys.

Figure 3:
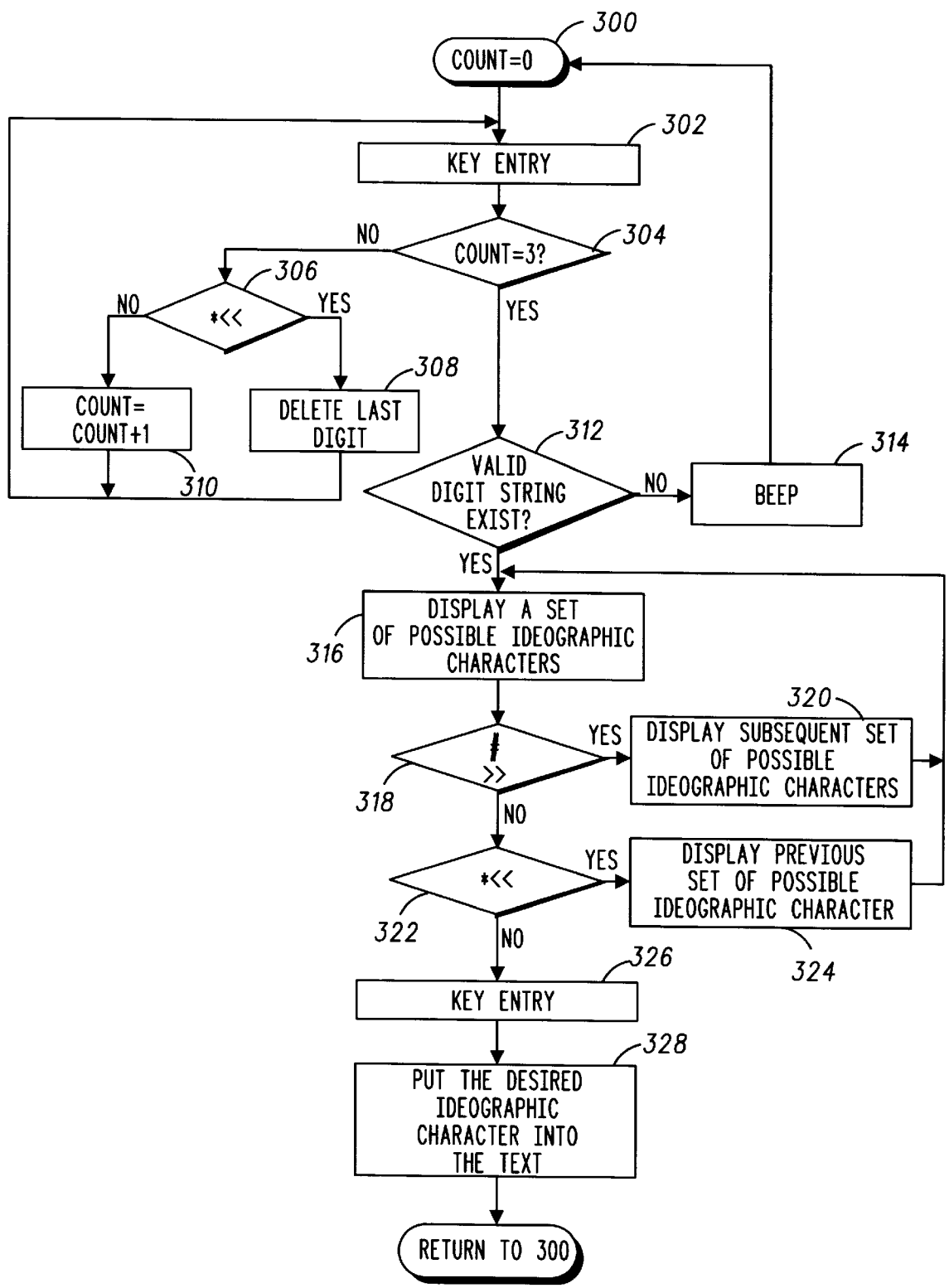
FIG. 3 is a flow diagram illustrating an operation of a first aspect of the preferred embodiment of the invention.

FIG. 3 is a flow diagram illustrating a software program for the operation of the preferred embodiment of the invention. The user can input ideographic characters by the use of a stroke based method. As shown in FIG. 3, a counter is shown to keep track of the number of entries received by the apparatus. The apparatus receives strokes one by one according to the chronological order of the strokes to create a desired ideographic character.

In a first aspect of the preferred embodiment of the invention, the user is only required to enter the first three strokes of the desired ideographic character before a digit string is completed (the digit string is completed when a predetermined number of entries, in this case three, is received by the apparatus). For example, as shown in FIG. 3, the counter is equal to zero at step 300. The apparatus receives a key entry from the user at step 302. The software program determines whether the count is equal to three based on the number of key entries received by the user at step 304. At this time, the user has only made one key entry, therefore the software program moves to step 306. In step 306, the asterisk key 120 allows the user to delete the last digit entered. If the asterisk key 120 is received by the apparatus, the software program deletes/ignores the last digit enter by the user in step 308. If the apparatus did not receive the asterisk key 120, the software program increments the counter by one at step 310. This process (steps 302–310) continues until the counter equals three (i.e., until the apparatus receives three key entries). The apparatus can receive entries from the user by various methods other than the input pad, for example, downloading, voice or any other suitable method for inputting ideographic characters.

When the counter equals three at step 304, the software program determines whether a valid digit string exists at step 312. Some combinations of key entries are not valid digit strings because the strokes and radicals corresponding to the keys 102, . . . 111 received by the apparatus do not identify an ideographic character. This concept of the validity of digit strings will be explored in more depth during the discussion of FIG. 5. Thus, if a valid digit string is not received, the program will give an error signal (e.g., an audible beep) at step 314 before returning to step 300. Note that when the software program returns to step 300 after receiving an invalid digit string, the counter is reset to zero until the apparatus receives further key entries or the like. If the digit string is valid at step 312, the software program will display a set of possible ideographic characters at step 316.

After the software program displays the set of possible ideographic characters to the user in the character display area 212 of the display 210, it enters a selection mode, thus allowing the user to only concentrate on finding the desired ideographic character from the set of possible ideographic characters.

When the software program enters the selection mode, it displays the set of possible ideographic characters with the same first three strokes that was previously entered by the user. The set of possible ideographic characters is preferably displayed in descending order, with the ideographic character having the highest possibility of being the desired ideographic character displayed first. The selection of the set is based on the chronological order in which the entries were received. Note that the set of possible ideographic characters can alternatively be displayed in any particular order the user desires (e.g., ascending order or random order), however, for purposes of this example and following examples, displaying the set of possible ideographic characters in descending order of probability (i.e. frequency of use) is the most advantageous because it allows the user to observe the most-likely ideographic characters first.

If the user cannot find the desired ideographic character from the first set of ideographic characters, the user may enter the pound key 122 at step 318. In response to the pound key 122 being entered at step 318, the software program displays in step 320 a subsequent set of possible ideographic characters having a next highest probability of having the desired ideographic character, preferably in descending order. Once the user observes the subsequent set of possible ideographic characters, the user can always return to a previous set of possible ideographic characters by entering the asterisk key 120 at step 324. This process of observing subsequent and previous sets of possible ideographic characters continues until the user finds the ideographic character he wants to input. Once the user has found the desired ideographic character, the user selects the desired ideographic at step 326 by entering the corresponding input key 102, . . . 111. After the apparatus receives the key entry identifying the selected ideographic character, the software program places the selected ideographic character into the text at step 328.

Note that in this particular embodiment, the present invention only used a total of ten input keys and two function keys: ten input keys are used to enter the strokes of the desired ideographic character and to select the desired ideographic character from the set of possible ideographic characters; one function key is used to display subsequent sets of possible ideographic characters; and one function key is used to display previous sets of possible ideographic characters. Thus, the user uses the same input keys to enter strokes as he does to enter radicals as he does to select the desired ideographic character from the set of possible ideographic characters.

Figure 4:
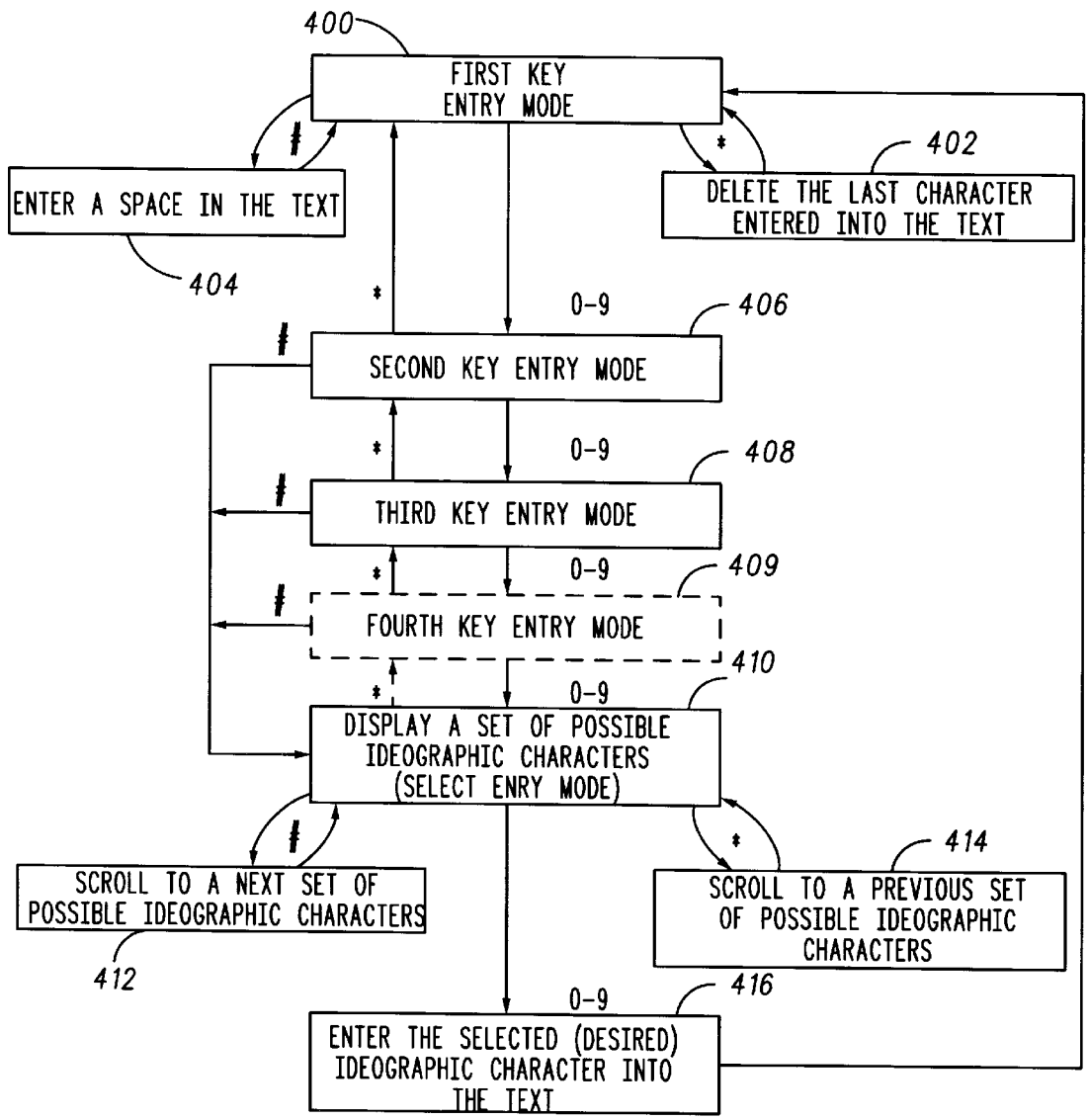
FIG. 4 is a mode diagram illustrating operation of the preferred embodiment and of an alternative embodiment of the present invention.

FIG. 4 is a mode diagram illustrating the preferred embodiment and of an alternative embodiment of the present invention. A first aspect of the preferred embodiment, as described above with reference to FIG. 3, is shown. Absent from FIG. 3 in describing and depicting the first aspect of the preferred embodiment is that while the user is entering his digit stream, but before the set of possible ideographic characters is displayed, the user has the option to delete the last input key entered by entering the asterisk key 120. When the software program receives the asterisk key 120, it ignores the last key entry and returns to the previous key entry mode.

FIG. 4 also describes a second aspect of the preferred embodiment. The user can input ideographic characters by the use of a radical-plus-stroke based method. In such a method, the software program enters the first key entry mode at step 400. Using the input keys 102, . . . 111, the user enters a first key entry that identifies the desired ideographic character. Once the apparatus receives the first key entry, the software program enters a second key entry mode at step 406.

The user uses the same input keys 102, . . . 111 that he used when he entered the first and second key entries. Once the apparatus receives the second key entry, the software program enters a third key entry mode at step 408. All that is required for the user to utilize the radical-plus-stroke based method is two input key entries. When the software program enters the third key entry mode at step 408, the user enters the pound key and the software program displays a set of possible ideographic characters at step 410, thus entering a select mode.

While in the select mode at step 410, the user observes the set of possible ideographic characters. If the desired ideographic character is not displayed in the set of possible ideographic characters, the user enters the pound key 122 at step 412 to scroll to a subsequent set of possible ideographic characters. The user continues to enter the pound key 122 to prompt the software to display subsequent sets of possible ideographic characters. If the user needs to return to a previous set of possible ideographic characters, the user enters the asterisk key 120 at step 414. When the apparatus receives the asterisk key 120, it will display the previous set of possible ideographic characters to the user. This process of displaying subsequent and previous sets of possible ideographic characters continues until the user selects the desired ideographic characters.

The user selects the desired ideographic character by using the same input keys 102, . . . 111 that he used when he entered the first, second and third key entries. In this example, the set displays ten possible ideographic characters. Each possible ideographic character in the set corresponds to one input key 102, . . . 111. After the desired ideographic characters is selected, the software program enters the desired ideographic character he selected into the text at step 416. After the desired ideographic characters is entered into the text, the software program automatically returns to the first key entry mode at step 400. At this point, the user can either do one of the following: delete the ideographic characters that was just entered into the text by entering the asterisk key 120 at step 402; enter a space after the ideographic character that was just entered by entering the pound key 122 at step 404; or enter a first key entry at step 406 to identify another desired ideographic character.

Note that after the software program displays a first set of possible ideographic characters and enters the select mode at step 410, the subsequent steps of scrolling, entering and deleting are the same for all embodiments. Thus, for purposes of avoiding redundancy, such steps of scrolling, entering and deleting will not be repeated in the description of each embodiment.

A third aspect of the preferred embodiment of the present invention describes a first overlap scenario with the stroke based method and the radical-plus-stroke based method. This overlap arises when the desired ideographic character comprises only one of the following: a single stroke; and a single radical. In the preferred embodiment, if the user desires to input one of these ideographic characters that only has one stroke or one radical, the user will have to follow the input key entry with a function key entry (e.g., the pound key 122). When the apparatus receives the function key, it knows that the user has completed a digit string.

Additional details pertaining to the third aspect of the preferred embodiment is discussed by way of an example as follows. An ambiguity results when the user desires to input an ideographic character where the stroke itself or the radical itself is the desired ideographic character. The user enters the one input key and subsequently enters the function key. When the apparatus receives an input key immediately followed by a function key, the software program knows that the desired ideographic character is either a stroke or a radical. Since each input key 102, . . . 111 represents at least a stroke and a radical, the software program does not know which is the desired ideographic character. To resolve this ambiguity, the software program displays a set of possible ideographic characters made up of only ideographic characters that have a single stroke that corresponds to the input key received and ideographic characters that have the single radical that corresponds to the input key received. Thus, displaying both possibilities resolves the ambiguity of mapping multiple strokes and radicals to a single input key and also allows the user to choose the desired ideographic character from the set of possible ideographic characters.

A fourth aspect of the preferred embodiment of the present invention describes a second overlap scenario with the stroke based method and the radical-plus-stroke based method. This overlaps arises when the desired ideographic character comprises only one of the following: two strokes; and a radical and at least one stroke. In the preferred embodiment, if the user desires to input one of these ideographic characters that only has two key input entries, the user will have to follow the two input key entries with a function key entry.

Additional details pertains to the fourth aspect of the preferred embodiment is discussed by way of example as follows. An ambiguity results when the user desires to input an ideographic character having either only two strokes or a radical and at least one stroke. The user enters two input keys and subsequently enters the function key at step 408. When the apparatus receives the two input key entries immediately followed by a function key, the software program knows that the desired ideographic character is either made up of only two strokes or a radical and at least one stroke. Since each input key represents at least a stroke and a radical, the software program does not know which is the desired ideographic character. To resolve this ambiguity, the software program displays a set of possible ideographic characters at step 410 made up of only ideographic characters having a first stroke and a second stroke corresponding to the first input key and the second input key, respectively, and ideographic characters having a radical and at least one stroke corresponding to the first input key and the second input key, respectively. Thus, the radical-plus-stroke based method in the second aspect of the preferred embodiment overlaps with ideographic characters having only two strokes as described in the fourth aspect of the preferred embodiment.

The present invention is adaptable to variable lengths of input strings. The maximum number of input key entries for the stroke based method the user has to enter in the preferred embodiment is three. That maximum number of input key entries the user has to enter in the preferred embodiment for the radical-plus-stroke based method is two.

A first aspect of an alternative embodiment for the stroke based method is similar to the process of the first aspect of the preferred embodiment. However, in the alternative embodiment, after the user enters the first three strokes of the desired ideographic character he wants to input in steps 400, 406 and 408, the software program then enters a fourth key entry mode at step 409. Once in the fourth key entry mode, the user enters the pound key 122 that indicates to the software program that the digit string is completed. Thus, in the alternative embodiment, the only difference over the first aspect of the preferred embodiment for the stroke based method is that the software program looks for the pound key 122 before it will display a set of possible ideographic characters. The maximum number of input key entries for the stroked based method of the alternative embodiment is still three (the same as in the preferred embodiment).

Moreover, the second aspect of the alternative embodiment for the radical-plus-stroke based method is similar to the second aspect of the preferred embodiment. Instead of entering two key entries (as in the second aspect of the preferred embodiment), the second aspect of the alternative embodiment allows the user to enter an additional 3 key entries, for a total of 4 key entries: a radical and three strokes. After the fourth key entry is received by the apparatus at step 409, the software program displays a set of possible ideographic characters at step 410. Thus, the maximum number of inputs for radical-plus-stroke based method in the alternative embodiment is four input keys. As a result of this mapping and methods when the apparatus receives a fourth input key, the software program knows to interpret the first input key as a radical as opposed to a stroke. All input keys entered after the first input key is always interpreted as strokes.

In regard to the alternative embodiment, ambiguity occurs with regard to ideographic characters having only the following: a single stroke, a single radical, two strokes, a radical plus one stroke; three strokes; and a radical plus two strokes. The above ideographic characters must be followed by a function key (e.g., the pound key). To resolve this ambiguity, when the software program displays the set of possible ideographic characters at step 410, the set will contain both possibilities. For example, when the digit stream consists of one input key entry (e.g., "2#"), the software program displays a set of possible ideographic characters having ideographic characters with a single stroke corresponding to the input key and having ideographic characters with a single radical corresponding to the input key. When the digit stream consists of two input key entries (e.g., "22#"), the software program displays a set of possible ideographic characters having only two strokes corresponding to the input key and ideographic characters having a radical and only one stroke corresponding to the input key. When the digit stream consists of three input key entries (e.g., "112#"), the software program displays a set of possible ideographic characters having at least three strokes corresponding to the input key and ideographic characters having a radical and only two strokes corresponding to the input key.

FIG. 5 is a data structure diagram showing two tables stores in the flash memory, for the embodiment of FIG. 4. The first table (Table 1) 500 has three columns. The first column 502 contains an input digit stream. The second column 504 shows a start address which points to a start address in a second table (Table 2) 550. The third column 506 in Table 1 500 indicates how many characters can be found in Table 2 550 corresponding to the selected digit stream. Table 2 550 has a first column 552 which is a simple address, a second column 554 which indicates the characters to be selected and a third column 556 in which is stored a rank order index.

In operation, a digit stream is entered (e.g., 2#).

From Table 1 500, there are two possible characters which can correspond to this digit stream. The two characters are stored in Table 2 550 starting at address 2. The rank order 556 in Table 2 550 indicates the order in which the possible characters are to be displayed (when there are multiple possible characters). The rank order indices can be changed to select a new order. Taking as another example, the digit stream "23#" has two possible characters in Table 2 550 starting at address 8.

Table 1 500 of FIG. 5 has a total of 1,207 entries and Table 2 550 has 10,015 entries. These tables are particularly prepared for the alternative embodiment of FIG. 4. In this example, a combination of ten input keys 102, . . . 111 represents either two strokes or one radical and only one stroke. Thus, for example, the digit stream "23#" presents only two alternative characters. If Table 2 550 were modified to the preferred embodiment of FIG. 4, two input keys could represent two strokes or one radical and one or more strokes. In such a case, the digit stream "23#" would result in more than two alternative characters from a modified Table 2 550. Note that Table 1 500 as shown has in its first column 502 of digit streams of one or two digits (as shown) as well as three or four digits (not shown). In a modified version of Table 1 500 (modified to the preferred embodiment of FIG. 4) there will be entries for one, two and three digit streams only, whereas if Table 1 500 is modified to the alternative embodiment of FIG. 4, there will be entries for one, two, three and four digit streams.

From FIG. 5, it can be seen that there are many conceivable digit streams that do not have a corresponding character. For example, "1#", "3#", "4#", "8#", "9#", "11#", "12#", etc. When one of these digit streams is entered, an error signal can be given (e.g., an audible beep) and/or the last key entry or the complete digit stream is ignored (or the pound key entry is ignored, if appropriate).

Further, language modeling data can be stored in Table 2 550, for example, for referencing bigram data, as is described in detail in patent application Ser. No. 08/806,504 filed on Feb. 24, 1997, which is incorporated herein by reference.

Note, the preferred embodiment of FIG. 4 is expected to be faster in use but the alternative embodiment of FIG. 4 is expected to give greater accuracy. The embodiment preferred by a user may depend on whether the user prefers to write using radicals or strokes. Tests show that thirty percent of Chinese characters can be entered using radicals and seventy percent can only be entered using strokes.

While the invention has been described in conjunction with a specific embodiment thereof, it is evident that many alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

I claim:

1. A method for inputting ideographic characters comprising the steps of:

receiving a first input key entry, a second input key entry and a third input key entry in chronological order;

interpreting that the first input key entry represents a radical when a fourth input key entry is received;

interpreting that the first input key entry represents a first stroke when a function key entry is received; and displaying, responsive to the steps of receiving and interpreting, a set of ideographic characters in descending order of probability of being a desired character, wherein probability is indicative of a frequency of use.

2. The method of claim 1 further comprising the steps of, when the first input key entry represents a radical:

interpreting that the second input key entry represents a first stroke;

interpreting that the third input key entry represents a second stroke;

interpreting that the fourth input key entry represents a third stroke; and wherein the step of displaying comprises displaying a set of possible ideographic characters having the radical followed by at least the first, second and third strokes.

3. The method of claim 1 further comprising the steps of, when the first input key entry represents a first stroke:

interpreting that the second input key entry represents a second stroke;

interpreting that the third input key entry represents a third stroke; and excluding radicals represented by the input keys from a set of possible ideographic characters; and wherein the step of displaying comprises displaying the set of possible ideographic characters having at least the first, second and third strokes.

4. The method of claim 3, further comprising the step of ranking, prior to the step of displaying, the set of possible ideographic characters in descending order of probability of containing a desired ideographic characters based on the order in which the input keys are received, wherein probability is indicative of frequency of use.

* * * * *